(12) United States Patent
Zarn

(10) Patent No.: US 10,075,411 B2
(45) Date of Patent: Sep. 11, 2018

(54) METHOD AND SYSTEM FOR PROCESSING A GEOGRAPHICAL INTERNET PROTOCOL (IP) LOOKUP REQUEST

(71) Applicants: SONY CORPORATION, Tokyo (JP); SONY NETWORK ENTERTAINMENT INTERNATIONAL LLC, Los Angeles, CA (US)

(72) Inventor: Miles Zarn, San Jose, CA (US)

(73) Assignees: SONY CORPORATION, Tokyo (JP); SONY NETWORK ENTERTAINMENT INTERNATIONAL LLC, Los Angeles, CA (US)

( * ) Notice: Subject to any disclaimer, the term of this patent is extended or adjusted under 35 U.S.C. 154(b) by 704 days.

(21) Appl. No.: 14/591,161

(22) Filed: Jan. 7, 2015

(65) Prior Publication Data
US 2016/0197878 A1 Jul. 7, 2016

(51) Int. Cl.
G06F 15/16 (2006.01)
H04L 29/12 (2006.01)
H04L 12/58 (2006.01)
H04L 29/06 (2006.01)
H04L 29/08 (2006.01)

(52) U.S. Cl.
CPC ......... *H04L 61/1552* (2013.01); *H04L 29/06* (2013.01); *H04L 51/12* (2013.01); *H04L 61/609* (2013.01); *H04L 63/08* (2013.01); *H04L 67/1036* (2013.01); *H04L 61/2015* (2013.01)

(58) Field of Classification Search
CPC ..... H04L 63/08; H04L 67/1036; H04L 51/12; H04L 29/06
See application file for complete search history.

(56) References Cited

U.S. PATENT DOCUMENTS

| 7,123,626 | B1* | 10/2006 | Feyerabend | H04L 29/06 370/328 |
| 8,463,915 | B1* | 6/2013 | Kim | H04L 67/1036 709/227 |
| 2011/0145273 | A1* | 6/2011 | Kolathaya | H04L 63/08 707/769 |
| 2011/0145922 | A1* | 6/2011 | Wood | H04L 51/12 726/24 |
| 2013/0097706 | A1 | 4/2013 | Titonis et al. | |

FOREIGN PATENT DOCUMENTS

CN 103561133 A 2/2014
WO 01/075632 A1 10/2001

* cited by examiner

Primary Examiner — Kyung H Shin
(74) Attorney, Agent, or Firm — Chip Law Group

(57) ABSTRACT

Various aspects of a method and a system to process a geographical internet protocol (IP) lookup request of an IP address are disclosed herein. The method is implemented in a first server. The first server receives a first request for the lookup of the IP address from a first computing device. In response to the received first request, data is retrieved from a cache memory. The retrieved data from the cache memory is communicated to the first computing device. The cache memory stores the data received in response to a prior received request for the lookup of the IP address.

22 Claims, 5 Drawing Sheets

METHOD AND SYSTEM FOR PROCESSING A GEOGRAPHICAL INTERNET PROTOCOL (IP) LOOKUP REQUEST

FIELD

Various embodiments of the disclosure relate to processing a geographical internet protocol (IP) lookup request. More specifically, various embodiments of the disclosure relate to processing a geographical IP lookup request of an IP address.

BACKGROUND

Recent advancements in the field of internet technology have introduced geographical internet protocol (IP) data look-up services to retrieve geographical IP data. Such geographical IP data lookup services may retrieve the geographical IP data within a time range of 50 ms to 500 ms. In response to a request received from a computing device, the geographical IP data lookup services in the network service provider may retrieve geographical IP data from various other devices. The retrieved geographical IP data may be transmitted to the computing device that generated the request.

In certain scenarios, latency may be involved when the retrieved geographical IP data is transmitted to the computing device due to one or more factors. The latency may be reduced based on one or more factors, such as network transmission speed, network error rate, and/or availability of services dependent on the geographical IP data. However, in such scenarios, multiple requests from more than one computing device may slow down the geographical IP data lookup services and may result in an extended latency.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and system are provided to process a geographical IP lookup request of an IP address substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various implementations may be found in a method and/or a system to process a geographical internet protocol (IP) lookup request of an IP address. The method may be implemented in a first server. The first server may receive a first request for the lookup of the IP address from a first computing device. In response to the received first request, data may be retrieved from a cache memory. The retrieved data from the cache memory may be communicated to the first computing device. The cache memory stores the data received in response to a prior received request for the lookup of the IP address.

In an embodiment, the data retrieved from the cache memory may be geographical IP data. In an embodiment, the geographical IP data may comprise one or more of an IP address, an internet service provider (ISP) name, a host name, an area code, a country name, a state, a province, a region, a city, and/or geographical coordinates associated with the first computing device. In an embodiment, the data stored in the cache memory, in response to a prior received request for the lookup of the IP address, may be retrieved from a second server. In an embodiment, the second server may comprise one of a network service provider server and/or an ISP server. In an embodiment, the first server may determine whether the data that corresponds to the received first request is stored in the cache memory. In an embodiment, when the data is not stored in the cache memory, the first server may receive data that may correspond to the first request from the second server. In an embodiment, the first server may update the cache memory when the data is not stored in the cache memory.

In an embodiment, the method may include retention of data that may correspond to the IP address within said cache memory when a count of the IP address exceeds a predefined threshold. The count may correspond to a number of one or more geographical IP lookup requests. In an embodiment, pre-stored data may be updated in the cache memory with updated data after a predefined time period. In an embodiment, the method may group the IP address of the first computing device based on a class type of a subnet of the first computing device. In an embodiment, the class type may be one of Class A, Class B, and Class C.

Figure 1:
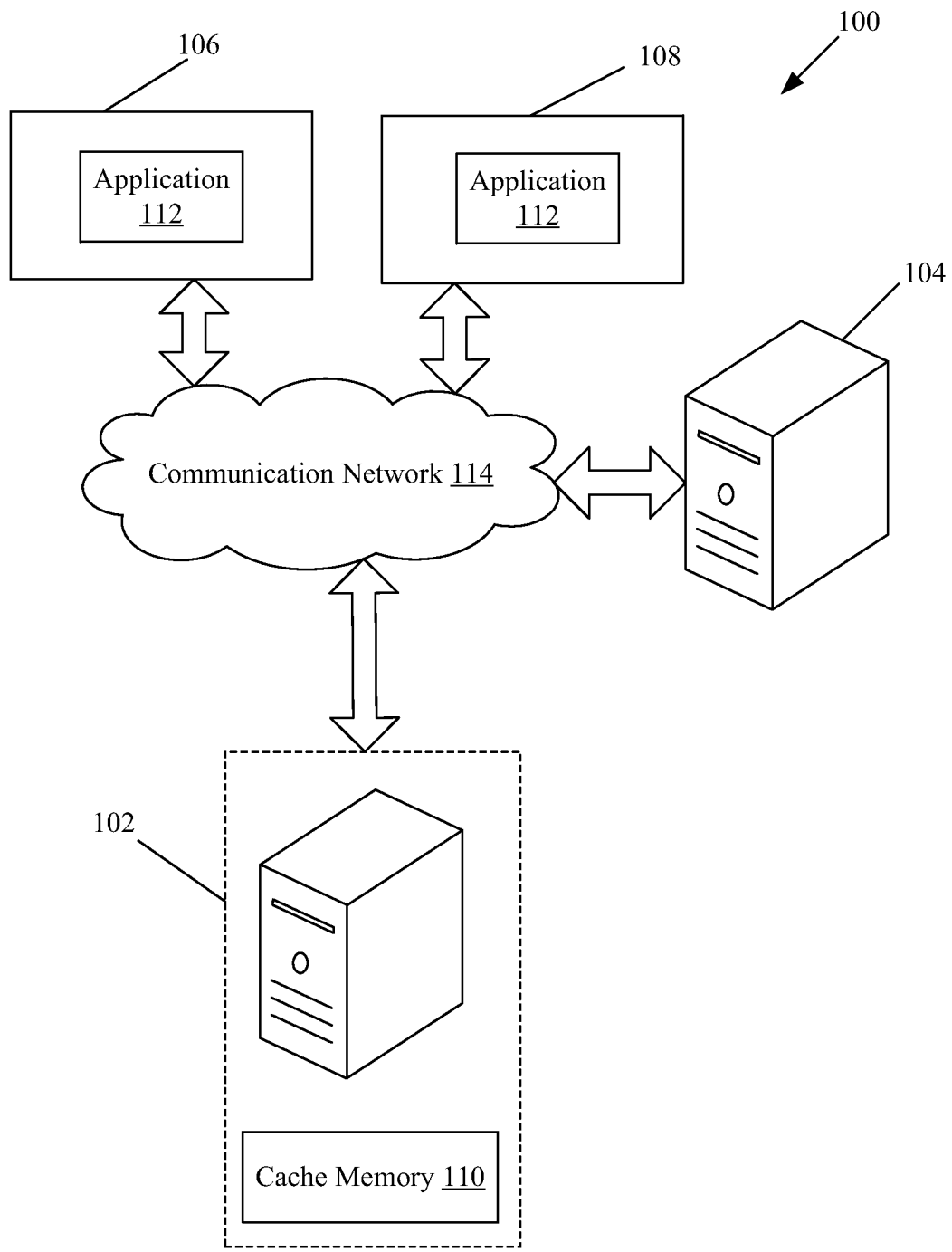
FIG. 1 is a block diagram that illustrates a network environment to process a geographical IP lookup request, in accordance with an embodiment of the disclosure.

FIG. 1 is a block diagram that illustrates a network environment to process a geographical IP lookup request, in accordance with an embodiment of the disclosure. With reference to FIG. 1, there is shown a first server 102, a second server 104, a first computing device 106, a second computing device 108, a cache memory 110, an application 112, and a communication network 114. The first server 102 may be communicatively coupled with the first computing device 106, the second computing device 108, and the second server 104, via the communication network 114. The first server 102 may be further communicatively coupled with the cache memory 110, via a wired or a wireless interface. The application 112 may be installed on the first computing device 106 and/or the second computing device 108.

The first server 102 may comprise suitable logic, circuitry, interfaces, and/or code that may be operable to provide one or more services to a plurality of computing devices. In an embodiment, the first server 102 may be a content service provider located in a specific geographic region. The first server 102 may be operable to provide the plurality of computing devices with geographical IP data based on the received geographical IP data associated with the geographical IP lookup requests. The first server 102 may be implemented as a single server or as a cluster of servers. The first server 102 may be an application server, a content server, and/or the like. Examples of the first server 102 may include Apache™ HTTP Server, Microsoft® Internet Information Services (IIS), IBM® Application Server, and/or Sun Java™ System Web Server.

The second server 104 may comprise suitable logic, circuitry, interfaces, and/or code that may be operable to provide the geographical IP data to the first server 102 based on the plurality of geographical IP lookup requests. The second server 104 may be associated with a database (not shown) and/or a data warehouse (not shown) that may store the geographical IP data. The geographical IP data may correspond to a plurality of computing devices, such as the first computing device 106 and the second computing device 108. Generic examples of the second server 104 comprise one of: a network service provider server, and/or an internet service provider (ISP) server. The second server 104 may be implemented as a single server or as a cluster of servers. Examples of the second server 104 may include Apache™ HTTP Server, Microsoft® Internet Information Services (IIS), IBM® Application Server, and/or Sun Java™ System Web Server.

The first computing device 106 and the second computing device 108 may comprise suitable logic, circuitry, interfaces, and/or code that may be operable to execute the application 112. The application 112 may generate a geographical IP lookup request for the geographical IP data that may be received by the first server 102. Examples of the first computing device 106 and the second computing device 108 may include, but are not limited to, a personal computer, a laptop, a smartphone, and/or a tablet, and/or a television.

The cache memory 110 may comprise suitable small size and high speed logic, circuitry, interfaces, and/or code that may be operable to store the geographical IP data. The first server 102 may retrieve the geographical IP data from the cache memory 110 for resolving the geographical IP lookup request. The cache memory 110 may be implemented in a Random Access Memory (RAM), a Hard Disk Drive (HDD), and/or a Secure Digital (SD) card. The cache memory 110 may be a specialized cache, a multi-level cache, or a multi-ported cache.

The application 112 may comprise suitable logic and/or code that may be executed at the first computing device 106 and/or the second computing device 108. The application 112 may correspond to an internet service application. In an embodiment, the application 112 may be downloaded from an application server (not shown) or from the first server 102. The application 112 may communicate with the first server 102, via the communication network 114. In an embodiment, the application 112 may be operable to receive the geographical IP data from the first server 102 and/or the cache memory 110. In an embodiment, the application 112 may be operable to receive the geographical IP data for a computing device, such as the first computing device 106 and/or the second computing device 108. Based on the received geographical IP data, the application 112 may personalize a plurality of functionalities of the first computing device 106 and/or the second computing device 108. The plurality of functionalities may include a personalized web content service, a tailored advertisement, traffic analysis, and digital rights enforcement, internet traffic routing, detection of compliance with legal regulations, detection online frauds, and/or the like. Examples of such application 112 may include, but are not limited to, a domain name service (DNS) resolution service application, a geographical IP data lookup service application, and/or a proxy detection service application.

The communication network 114 may include a medium through which the first server 102 may communicate with the application 112. The communication network 114 may include a medium through which the first server 102 may communicate with the second server 104. The communication network 114 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN). One or more computing devices, such as first computing device 106 and second computing device 108, may be operable to connect to the first server 102, via the communication network 114, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

In operation, the application 112 may be installed in the first computing device 106. The application 112 may generate and transmit a first geographical IP lookup request to the first server 102, via the communication network 114. The first geographical IP lookup request may comprise at least an IP address, which may correspond to the first computing device 106. The first server 102 may receive the first geographical IP lookup request from the first computing device 106. In response to the received first geographical IP lookup request, the first server 102 may retrieve the geographical IP data from the cache memory 110. In an embodiment, the geographical IP data may include one or more of an internet protocol (IP) address, an internet service provider (ISP) name, a host name, an area code, a country name, a state, a province, a region, a city, and/or geographical coordinates associated with the first computing device 106.

In an embodiment, the first server 102 may communicate the retrieved geographical IP data to the first computing device 106. In an embodiment, the first server 102 may determine that the geographical IP data, which corresponds to the first geographical IP lookup request, is not stored in the cache memory 110. In such an embodiment, the first server 102 may communicate the first geographical IP lookup request to the second server 104. Based on the first geographical IP lookup request, the first server 102 may receive new geographical IP data from the second server 104. In an embodiment, the first server 102 may update the cache memory 110 based on the new geographical IP data received from the second server 104, when the geographical IP is not stored in the cache memory 110.

In an embodiment, the first server 102 may receive a second geographical IP lookup request from the second computing device 108. The second geographical IP lookup request may correspond to the geographical IP data received for the first geographical IP lookup request. The first server 102 may receive the second geographical IP lookup request after the geographical IP data that corresponds to the first geographical IP lookup request is communicated to the first computing device 106. In response to the received second geographical IP lookup request, the geographical IP data may be retrieved from the cache memory 110. The retrieved geographical IP data may be communicated to the second computing device 108.

In an embodiment, the first server 102 may transmit a plurality of geographical IP lookup requests to the second server 104 to update the cache memory 110. The plurality of geographical IP lookup requests may correspond to a plurality of potentially obsolete geographical IP data entries stored within the cache memory 110. The geographical IP data may be determined to be obsolete based on a predefined time period. Based on the transmitted plurality of geographical IP lookup requests, the first server 102 may receive a plurality of new geographical IP data from the second server 104. In an embodiment, the first server 102 may update the cache memory 110, based on the new geographical IP data received from the second server 104. In an embodiment, the new geographical IP data received from the second server 104 may be updated geographical IP data after the predefined time period.

In an embodiment, the first server 102 may implement an adaptive mechanism to track a count that may correspond to one or more geographical IP lookup requests received from one or more computing devices. The one or more geographical IP lookup requests may correspond to one or more IP addresses. When the count exceeds a predefined threshold, the one or more geographical IP lookup requests may be stored in a high-frequency list. Based on the high-frequency list, the first server 102 may retain the geographical IP data of the one or more IP addresses, in the cache memory 110. In such an embodiment, the geographical IP data of the one or more IP addresses that correspond to the high-frequency list may be updated in the cache memory 110 more frequently than other geographical IP data. The other geographical IP data may correspond to the geographical IP data of one or more geographical IP lookup requests with a count less than the predefined threshold.

In an embodiment, the first server 102 may implement an adaptive refresh mechanism to track a rate of change of the geographical IP data that may correspond to one or more geographical IP data lookup requests related to one or more IP addresses. The rate of change of the geographical IP data resolution may be considered when the geographical IP data is refreshed. When the rate of change of the geographical IP data exceeds a predefined threshold, such geographical IP data may be stored in a high-frequency change list. In an embodiment, based on the high-frequency change list, the first server 102 may retain the geographical IP data of the one or more IP addresses, in the cache memory 110. In such an embodiment, the geographical IP data of the one or more IP addresses that correspond to the high-frequency change list may be updated in the cache memory 110 more frequently than other geographical IP data. The other geographical IP data may correspond to the geographical IP data of the one or more geographical IP data lookup requests with the rate of change less than the predefined threshold.

In an embodiment, the first server 102 may implement an adaptive sampling mechanism to track differences of resolved geographical IP data in response to the one or more geographical IP data lookup requests. The resolved geographical IP data may be associated with the one or more geographical IP data lookup requests related to the one or more IP addresses. The differences in the resolved geographical IP data may be considered when sampling the resolved geographical IP data. When the amount of differences in the resolved geographical IP data exceeds a predefined threshold, the geographical IP data may be stored in a high-variance sample list. In an embodiment, based on the high-variance sample list, the first server 102 may sample the geographical IP data of the one or more IP addresses in a subnet, in the cache memory 110. In such an embodiment, the geographical IP data of the one or more IP addresses that correspond to the high-variance sample list may be updated in the cache memory 110 more frequently and precisely than other geographical IP data. The other geographical IP data may correspond to the geographical IP data of the one or more geographical IP data lookup requests with the amount of differences less than the predefined threshold.

In an embodiment, a plurality of IP addresses may be leased to one or more computing devices, via one or more Internet Service Providers (ISPs). The one or more ISPs may be configured to implement a technique of subnetting an IP address space. The subnetted IP address space may be associated with a specific geographic location. Thus, a subnet may correspond to a specific geographic location. The subnetting of the IP address space may be implemented to identify a host address and a network address of a computing device, such as the first computing device 106, based on a subnet mask. The network address may facilitate routing of a communication related to the subnetting of the IP address space to a destination network. Based on the communication, the host, such as the first computing device 106, on the destination network may be identified. The first server 102 may identify an IP address associated with the first computing device 106 with the specific geographic location, based on the technique of subnetting. Thus, one or more computing devices, which use the application 112 within a geographic location similar to that of the first computing device 106, may use the IP address of the first computing device 106. In an embodiment, the first server 102 may store and/or update the geographical IP data within the cache memory 110.

Figure 2:
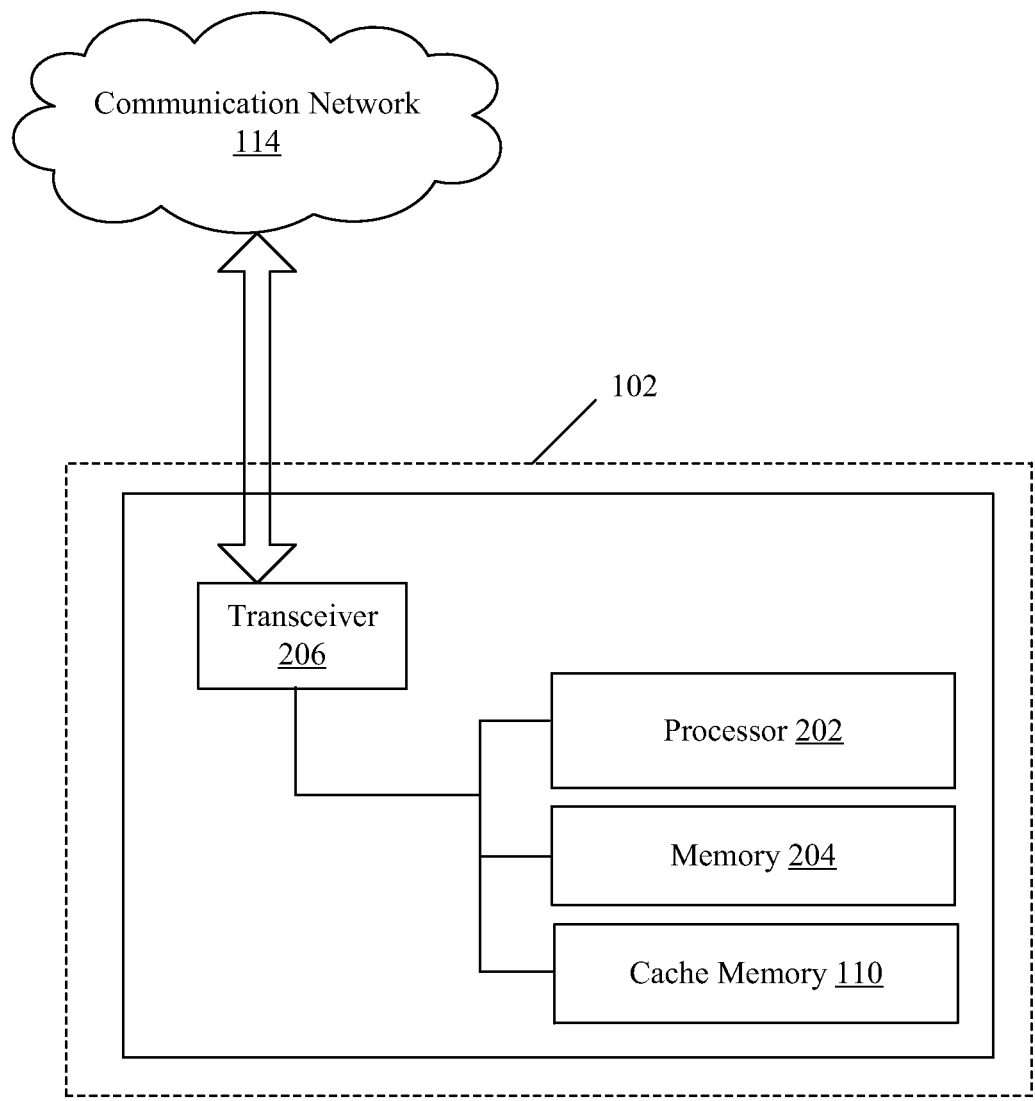
FIG. 2 is a block diagram that illustrates various components of a first server, in accordance with an embodiment of the disclosure.

FIG. 2 is a block diagram that illustrates the various components of the first server 102, in accordance with an embodiment of the disclosure. FIG. 2 is explained in conjunction with elements from FIG. 1. With reference to FIG. 2, there is shown the first server 102. The first server 102 may comprise one or more processors, such as a processor 202, a memory 204, and a transceiver 206.

The processor 202 may be communicatively coupled with the cache memory 110, the memory 204, and the transceiver 206. The transceiver 206 may be communicatively coupled with other computing devices, such as the first computing device 106 and/or the second computing device 108. The transceiver 206 may further be communicatively coupled with other servers, such as the second server 104, via the communication network 114.

The processor 202 may comprise suitable logic, circuitry, interfaces, and/or code that may be operable to execute a set of instructions stored in the memory 204. The processor 202 may be implemented based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processor.

The memory 204 may comprise suitable logic, circuitry, interfaces, and/or code that may be operable to store the set of instructions, which may be executed by the processor 202. In an embodiment, the memory 204 may store a count that may correspond to one or more geographical IP lookup requests generated by the application 112, based on which the geographical IP data may be retrieved from the cache memory 110. In an embodiment, the memory 204 may store a list of geographical IP lookup requests that have a count greater than a predefined threshold. The memory 204 may be implemented based on a Random Access Memory (RAM), a Read-Only Memory (ROM), a Hard Disk Drive (HDD), a storage server and/or a Secure Digital (SD) card.

The transceiver 206 may comprise suitable logic, circuitry, interfaces, and/or code that may be operable to communicate with external devices, such as the first computing device 106, the second computing device 108, and/or the second server 104, via the communication network 114. The transceiver 206 may implement known technologies to support wired or wireless communication with the communication network 114. The transceiver 206 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the transceiver 206 may receive the first geographical IP lookup request for geographical IP data from the application 112, installed in the first computing device 106. The first geographical IP lookup request may comprise the IP address of the first computing device 106. In response to the received first geographical IP lookup request, the processor 202 may retrieve the geographical IP data from the cache memory 110. The transceiver 206 may communicate the geographical IP data retrieved from the cache memory 110, to the first computing device 106. In an embodiment, the response to the received first geographical IP lookup request may be communicated to the first computing device 106 within a pre-defined time duration. In an embodiment, the cache memory 110 may store the geographical IP data in response to a prior received request for the lookup of the IP address.

In an embodiment, the processor 202 may determine that the geographical IP data that corresponds to the received first geographical IP lookup request is not stored in the cache memory 110. In such an embodiment, the processor 202 may receive the requested geographical IP data from the second server 104. In an embodiment, the processor 202 may update the cache memory 110 based on the geographical IP data received from the second server 104.

In an exemplary implementation, the transceiver 206 may receive the second geographical IP lookup request from the second computing device 108. The second geographical IP lookup request may be received after the geographical IP data for the first geographical IP lookup request is communicated to the first computing device 106. In an embodiment, the geographical IP data requested from the second computing device 108 may be similar to the geographical IP data already communicated to the first computing device 106. In response to the received second geographical IP lookup request, transceiver 206 may retrieve the geographical IP data from the cache memory 110. The retrieved geographical IP data may be communicated to the second computing device 108, via the transceiver 206.

In an embodiment, the processor 202 may be operable to store the geographical IP data in the cache memory 110. The geographical IP data stored in the cache memory 110 may be based on the one or more IP addresses that may be grouped based on a class type of a subnet. For example, the processor 202 may group the one or more IP addresses that may correspond to a plurality of computing devices, based on a, "Class C Subnet". Subsequently, the processor 202 may assign a network identification (ID) bit mask to the grouped IP addresses. Based on the network ID bit mask, the geographical IP data may be retrieved in accordance with the class type of the subnet that corresponds to the received geographical IP lookup request.

In an embodiment, the processor 202 may index the geographical IP data based on one or more indexing algorithms, such as a B+ Tree algorithm and/or a Bitmap algorithm. The indexed geographical IP data may be stored in the cache memory 110 and may be utilized for efficient data retrieval. In an embodiment, the geographical IP data may be stored in a four-byte data structure. In an embodiment, the processor 202 may utilize one or more Boolean operators, such as a XAND operator and/or a XOR operator, to retrieve the geographical IP data from the indexed data structure. In an embodiment, the processor 202 may reduce the count of received geographical IP lookup requests based on a common subnet of IP addresses that may correspond to a specific geographic area.

In an embodiment, the cache memory 110 may be updated with new geographical IP data that may be received from the second server 104. The new geographical IP data may be received from the second server 104, in response to a plurality of geographical IP lookup requests transmitted by the processor 202, via the transceiver 206. The plurality of geographical IP lookup requests may correspond to a plurality of potentially obsolete geographical IP data stored within the cache memory 110. The processor 202 may determine the geographical IP data to be obsolete based on the predefined time period. In an embodiment, the processor 202 may simultaneously transmit the plurality of geographical IP lookup requests to the second server 104.

In an embodiment, the processor 202 may update the cache memory 110 with the new geographical IP data after a predefined time period based on an adaptive mechanism. In an embodiment, the processor 202 may determine a count of the received geographical IP lookup requests and store the count and the geographical IP lookup requests in the memory 204. The processor 202 may determine a high-frequency list of the geographical IP lookup requests. The high-frequency list may comprise such geographical IP lookup requests with the count of the geographical IP lookup requests that exceeds a predefined threshold value. Based on the high-frequency list, the processor 202 may retain the geographical IP data for the geographical IP lookup requests in the cache memory 110. In an embodiment, the processor 202 may update the geographical IP data for the one or more IP addresses in the high-frequency list at frequent time intervals.

Figure 3:
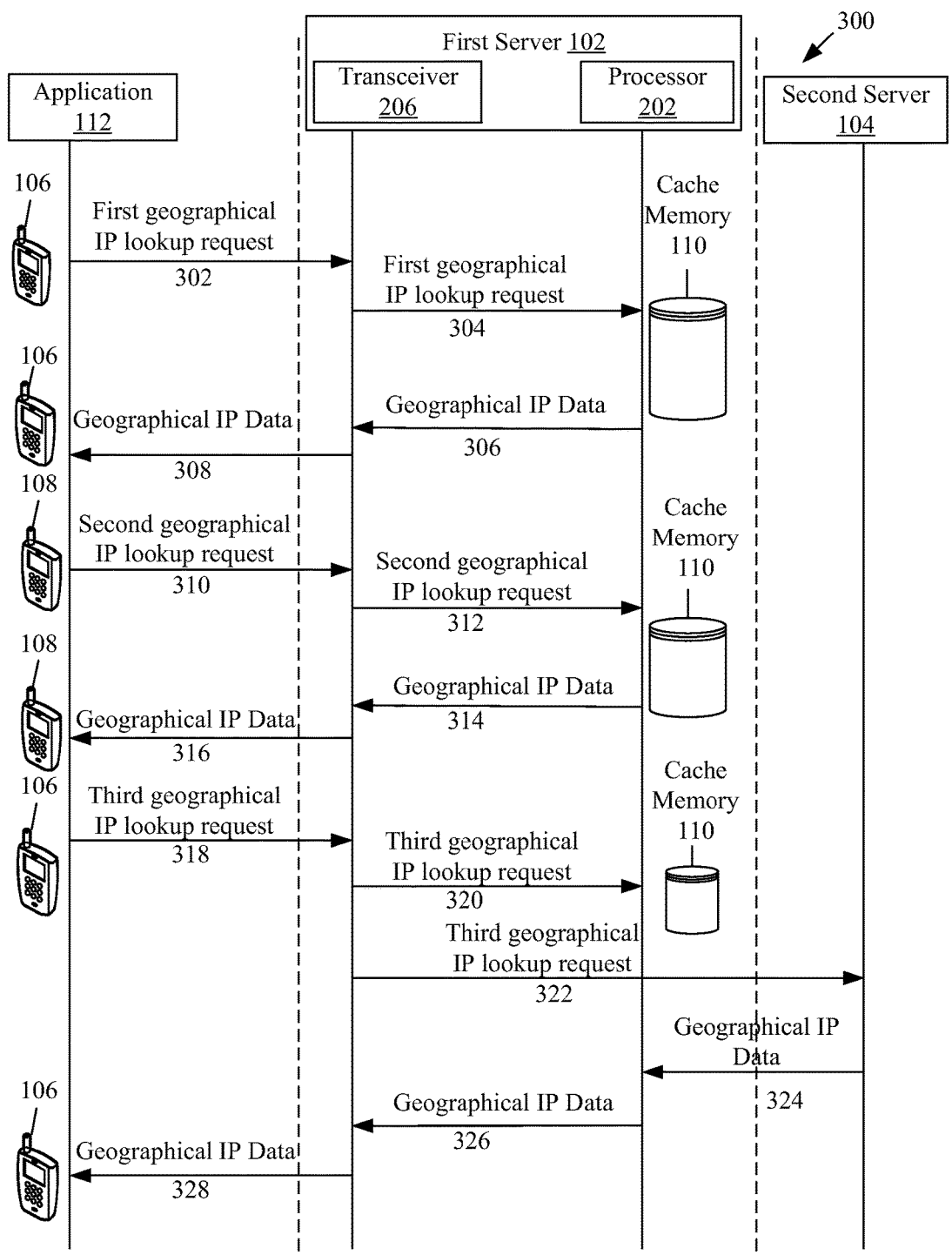
FIG. 3 is a sequence diagram that illustrates various steps involved to process a geographical IP lookup request, in accordance with an embodiment of the disclosure.

FIG. 3 is a sequence diagram that illustrates the various steps involved to process a geographical IP lookup request, in accordance with an embodiment of the disclosure. FIG. 3 is explained in conjunction with elements from FIG. 1 and FIG. 2. With reference to FIG. 3, there is shown the network components involved to perform the steps mentioned in the sequence diagram. The network components may include the application 112, the processor 202, the transceiver 206, the cache memory 110 and the second server 104. The processor 202, the transceiver 206, and the cache memory 110 may correspond to the first server 102.

At step 302, the application 112 in the first computing device 106 may transmit a first geographical IP lookup request to the transceiver 206. At step 304, the transceiver 206 may communicate the received first geographical IP lookup request to the processor 202. In response to the step 304, the processor 202 may retrieve the geographical IP data, which corresponds to the received first geographical IP lookup request, from the cache memory 110. At step 306, the processor 202 may communicate the retrieved geographical data to the transceiver 206. At step 308, the transceiver 206 may transmit the geographical data communicated by the processor 202 to the application 112.

At step 310, the application 112 in the second computing device 108 may transmit a second geographical IP lookup request to the transceiver 206. The transmitted second request may originate from the same subnet from where the first geographical IP lookup request was received. At step 312, the transceiver 206 may communicate the received second geographical IP lookup request to the processor 202. In response to the step 312, the processor 202 may retrieve the geographical IP data, which corresponds to the received second geographical IP lookup request, from the cache memory 110. The geographical IP data may be similar to the geographical IP data already communicated to the first computing device 106, in response to the first geographical IP lookup request. At step 314, the processor 202 may communicate the retrieved geographical IP data to the transceiver 206. At end step 316, the transceiver 206 may transmit the geographical IP data communicated by the processor 202 to the application 112.

At step 318, the application 112 in the first computing device 106 may transmit a third geographical IP lookup request to the transceiver 206. In an embodiment, the location of the first computing device 106 may have changed and the third request may be from the new location. At step 320, the transceiver 206 may communicate the received third geographical IP lookup request to the processor 202. The processor 202 may determine that the geographical IP data requested by the third geographical IP lookup request is not stored in the cache memory 110. Based on the determination, at step 322, the transceiver 206 may transmit the third geographical IP lookup request to the second server 104. In response to the step 322, at step 324 the second server 104 may communicate the geographical IP data that corresponds to the received third geographical IP lookup request to the processor 202. The processor 202 may update the cache memory 110 based on the geographical IP data communicated by the second server 104. At step 326, the processor 202 may communicate the received geographical IP data to the transceiver 206. At step 328, the transceiver 206 may transmit the geographical IP data communicated by the processor 202 to the application 112.

Figure 4:
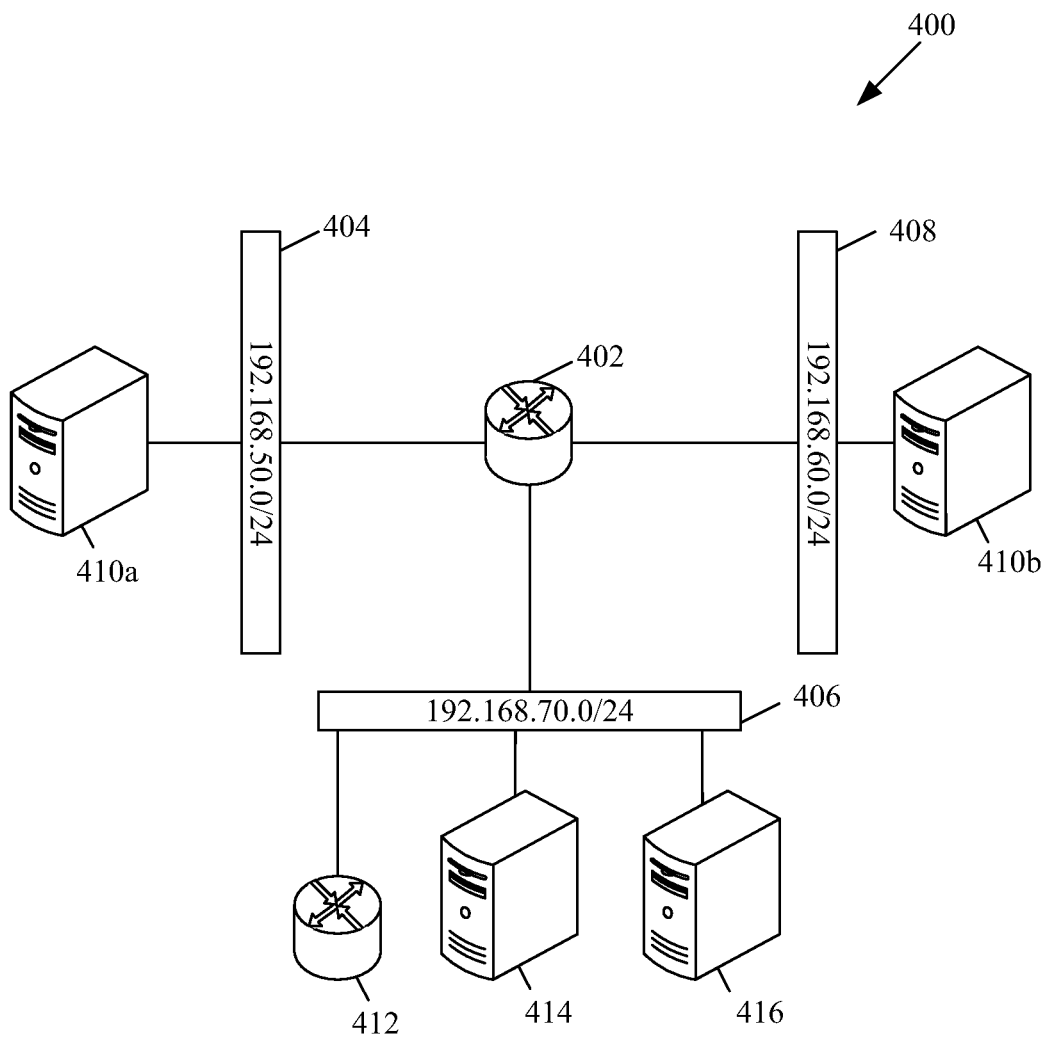
FIG. 4 is a diagram that illustrates an implementation of a geographical IP cache service based on subnetting performed by Internet Service Providers (ISPs), in accordance with an embodiment of the disclosure.

FIG. 4 is a diagram 400 that illustrates an implementation of a geographical IP cache service based on subnetting performed by Internet Service Providers (ISPs), in accordance with an embodiment of the disclosure. FIG. 4 is described in conjunction with elements of FIG. 1 and FIG. 2. With reference to FIG. 4, the diagram 400 includes a router 402, a first subnet 404, a second subnet 406, a third subnet 408, a plurality of servers, such as servers 410a and 410b, an external router 412, and one or more clients, such as a laptop client 414 and a workstation client 416.

In an embodiment, the plurality of IP addresses may be assigned to the one or more computing devices, such as the servers 410a and 410b, the external router 412, the laptop client 414, and the workstation client 416, by the router 402. In an embodiment, the router 402 may be associated with one or more ISPs. The one or more ISPs may implement a technique of subnetting to identify the plurality of IP addresses corresponding to each of the one or more computing devices within a specific geographic location. In an embodiment, the one or more ISPs may use Dynamic Host Configuration Protocol (DHCP) to assign an IP address to one or more computing devices within each of the first subnet 404, the second subnet 406, and the third subnet 408. Thus, the one or more computing devices in the same geographic location using the application 112 may use a same IP address.

With reference to FIG. 4, the server 410a may be located within the geographic location of the first subnet 404. The external router 412, the laptop client 414, and the workstation client 416 may be located within the geographic location of the second subnet 406. The server 410b may be located within the geographic location of the third subnet 408. In an embodiment, the router 402 may divide internet traffic into three subnets, such as the first subnet 404 ("192.168.50.0/24"), the second subnet 406 ("192.168.71.0/24"), and the third subnet 408 ("192.168.60.60/24"). Each of the first subnet 404, the second subnet 406, and the third subnet 408 may serve a specific geographical location. The router 402 may assign an IP address to the server 410a within the IP address space of the first subnet 404. The router 402 may further assign IP addresses to the external router 412, the laptop client 414, and the workstation client 416 within the IP address space of the second subnet 406. The router 402 may further assign an IP address to the server 410b within the IP address space of the third subnet 408.

In an embodiment, the first server 102 (FIG. 1) may determine an IP address of the laptop client 414 within a specific location, such as the second subnet 406, to resolve a request for geographical IP data. The IP address of the laptop client 414 within the specific geographic location may be determined based on subnetting.

In an embodiment, the first server 102 may store and/or update the geographical IP data within the cache memory 110 (FIG. 1) based on the subnetting. In an embodiment, the first server 102 may determine a frequency based on which the geographical IP data within the cache memory 110 is refreshed. In an embodiment, the subnetting of the IP address space may be performed to identify a host address of a specific host and corresponding network address based on a subnet mask. The network address may facilitate routing of a communication related to the subnetting of the IP address space to a destination network. Based on the communication, the specific host on the destination network may be identified. In an exemplary scenario, the first server 102 may identify an IP address, such as "10.12.36.200", associated with the laptop client 414 with the specific geographic location based on the subnetting. A subnet mask, such as, "255.255.255.2", may be used to identify a network address, such as "10.12.36.0", and a host address ("0.0.0.200") of the laptop client 414.

In an embodiment, each of the geographic location may be associated with one or more local regions. In an embodiment, each subnet may be associated with the local region. Thus, one or more computing devices, such as the external router 412, the laptop client 414, and the workstation client 416, in one subnet, such as the second subnet 406, may be in the same local region. In such an embodiment, the first server 102 may use geographical IP data corresponding to an IP address of a computing device, such as the laptop client 414, to represent the second subnet 406. The geographical IP data corresponding to an IP address of a computing device, such as the laptop client 414, may be stored in the cache memory 110. In an exemplary scenario, the Class B subnet may comprise IPv4 addresses from "128.0.0.0" to "191.255.255.255" containing 65,536 unique IP address for the geographical IP data. In an embodiment, the first server 102 may perform a geographical IP data resolution of Class B network represented by a classless inter domain routing (CIDR) notation, such as CIDR/16, where the numeric value "16" may represent a routing prefix size. Based on one geographical IP data resolution, the first server 102 may define a country of operation of an ISP and all the 65,536 IP addresses. In another exemplary scenario, geographical IP data resolution of a Class C network (CIDR/24) containing 255 IPv4 addresses may be performed. Based on the geographical IP data resolution of the Class C network (CIDR/24), the first server 102 may define a location of operation for all the 255 IPv4 addresses. The first server 102 may obtain additional precision by resolving subnets in the Class C range. Examples of subnets in the Class C range may include CIDR/26 containing 64 IPv4 addresses and CIDR/28 containing 16 IPv4 addresses. Thus, the first server 102 may throttle the precision of the geographical IP data resolution and may manage consumption of the cache memory 110. In an embodiment, the first server 102 may also manage the expiry time frame of the cache memory 110 to reduce request volume and related fees to a geographical IP service provider.

Figure 5:
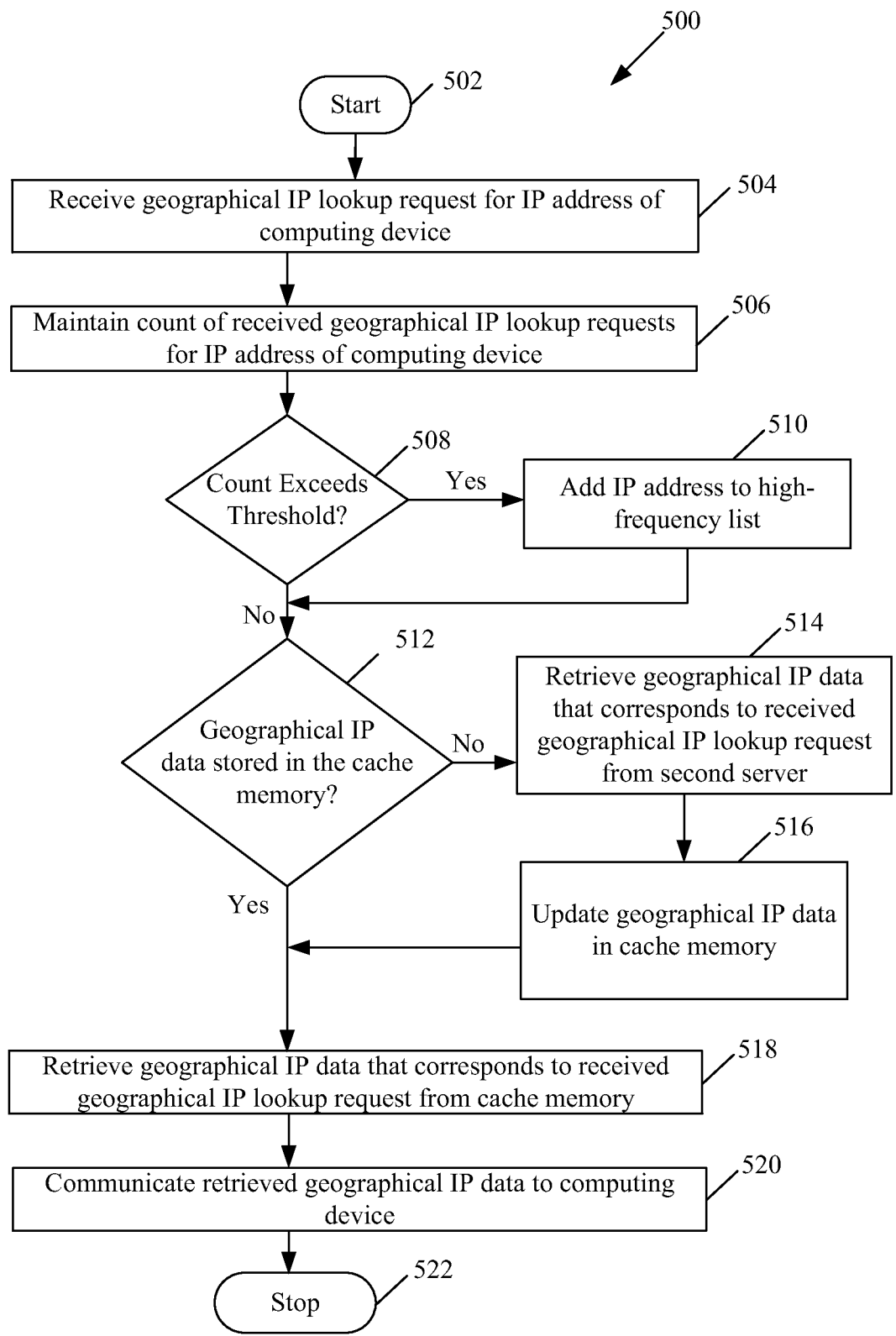
FIG. 5 is a flow chart that illustrates the steps involved to process a geographical IP lookup request, in accordance with an embodiment of the disclosure.

FIG. 5 is a flow chart that illustrates the steps involved to process a geographical IP lookup request, in accordance with an embodiment of the disclosure. FIG. 5 is described in conjunction with elements of FIG. 1 and FIG. 2. With reference to FIG. 5, there is shown a method 500 that may be implemented in the first server 102. The first server 102 may be communicatively coupled to the second server 104, the first computing device 106, and the second computing device 108, via the communication network 114.

The method begins at step 502 and proceeds to step 504. At step 504, the first server 102 may receive a geographical IP lookup request for the IP address of the first computing device 106. At step 506, the processor 202 may maintain a count of the received geographical IP lookup requests for the IP address of the first computing device 106. At step 508, the processor 202 may determine whether the count of the received geographical IP lookup request exceeds a predefined threshold. In instances when the count exceeds the predefined threshold, the method may proceed to step 510. In instances when the count does not exceed the predefined threshold, the method may proceed to step 512. At step 510, the processor 202 may determine the received geographical IP lookup request and add corresponding IP address to be in the high-frequency list. At step 512, the processor 202 may determine whether geographical IP data is stored in the cache memory 110. When the geographical IP data is not stored in the cache memory 110, the method proceeds to step 514. When the geographical IP data is stored in the cache memory 110, the method proceeds to step 518. At step 514, the processor 202 may retrieve the geographical IP data from the second server 104. At step 516, based on the geographical IP data retrieved from the second server 104, the processor 202 may update the geographical IP data in the cache memory 110. At step 518, the geographical IP data that corresponds to the received geographical IP lookup request may be retrieved from the cache memory 110. At step 520, the retrieved geographical IP data from the cache memory 110 may be communicated to the first computing device 106. In an embodiment, the cache memory 110 may store the geographical IP data in response to a prior received request for the lookup of the IP address. Control passes to end step 522.

In accordance with an embodiment of the disclosure, the system to process a geographical IP lookup request for an IP address may comprise the first server 102 (FIG. 1). The first server 102 may be communicatively coupled with the communication network 114 (FIG. 1). The processor 202 (FIG. 2) may be operable to receive the first geographical IP lookup request for the lookup of the IP address from the first computing device 106 (FIG. 1). In response to the received geographical IP lookup request, the processor 202 may retrieve data from the cache memory 110 (FIG. 1). The processor 202 may be further operable to communicate the retrieved data to the first computing device 106. The data retrieved from the cache memory 110 may be stored in response to the prior received geographical IP lookup request for the lookup of the IP address.

Various embodiments of the disclosure may provide a non-transitory computer readable medium and/or storage medium, and/or a non-transitory machine readable medium and/or storage medium having stored thereon, a machine code and/or a computer program having at least one code section executable by a machine and/or a computer to process a geographical IP lookup request for the IP address of the computing device. The at least one code section in the server may cause the machine and/or computer to perform the steps, which may comprise the receipt of a first geographical IP lookup request of an IP address from the first computing device 106. In response to the received first geographical IP lookup request, the data may be retrieved from a cache memory 110. The retrieved data from the cache memory 110 may be communicated to the first computing device 106. The cache memory 110 stores the data received in response to the prior received geographical IP lookup request for the IP address.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system may be operable to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
   in a first server:
      receiving a first request for lookup of an Internet Protocol (IP) address from a first computing device;
      instructing a cache memory in said first server to store data, that is associated with said received first request, based on said received first request for said lookup of said IP address;
      receiving a second request for said lookup of said IP address from said first computing device;
      retrieving said stored data from said cache memory based on said received second request;
      retaining said stored data corresponding to said IP address within said cache memory based on a count of said IP address exceeding a first threshold, wherein said count corresponds to a number of at least one geographical IP lookup request; and
      communicating via a communication network, said retrieved stored data to said first computing device.

2. The method of claim 1, wherein said retrieved stored data from said cache memory is geographical IP data.

3. The method of claim 2, wherein said geographical IP data comprises at least one of a first IP address, an Internet Service Provider (ISP) name, a host name, an area code, a country name, a state, a province, a region, a city, or geographical coordinates associated with said first computing device.

4. The method of claim 2, further comprising tracking a rate of change of said geographical IP data based on an adaptive refresh mechanism, wherein said geographical IP data corresponds to said at least one geographical IP lookup request, and wherein said at least one geographical IP lookup request is associated with at least one IP address.

5. The method of claim 4, further comprising storing said geographical IP data in said cache memory based on determination that said rate of change of said geographical IP data exceeds a second threshold.

6. The method of claim 1, wherein said stored data is retrieved from a second server.

7. The method of claim 6, wherein said second server comprises one of a network service provider server or an Internet Service Provider (ISP) server.

8. The method of claim 6, further comprising receiving said stored data corresponding to said received second request from said second server based on unavailability of said stored data in said cache memory.

9. The method of claim 1, further comprising determining said stored data corresponding to said received second request is in said cache memory.

10. The method of claim 1, further comprising updating said cache memory based on unavailability of said stored data in said cache memory.

11. The method of claim 1, further comprising updating said stored data in said cache memory with updated data after a time period.

12. The method of claim 1, further comprising grouping said IP address of said first computing device based on a class type of a subnet of said first computing device, wherein said class type is one of Class A, Class B, or Class C.

13. The method of claim 1, further comprising updating said cache memory based on updated geographical IP data received from a second server.

14. The method of claim 1, further comprising transmitting, via said first server, said at least one geographical IP lookup request to a second server to update said cache memory.

15. A system, comprising:
    one or more processors in a first server configured to:
       receive a first request for lookup of an Internet Protocol (IP) address from a first computing device;
       instruct a cache memory in said first server to store data, that is associated with said received first request, based on said received first request for said lookup of said IP address;
       receive a second request for said lookup of said IP address from said first computing device;
       retrieve said stored data from said cache memory based on said received second request;
       retain said stored data corresponding to said IP address within said cache memory based on a count of said IP address that exceeds a threshold, wherein said count corresponds to a number of at least one geographical IP lookup request; and
       communicate via a communication network, said retrieved stored data to said first computing device.

16. The system of claim 15, wherein said retrieved stored data from said cache memory is geographical IP data.

17. The system of claim 16, wherein said geographical IP data comprises at least one of a first IP address, an Internet Service Provider (ISP) name, a host name, an area code, a country name, a state, a province, a region, a city, or geographical coordinates associated with said first computing device.

18. The system of claim 15, wherein said stored data is retrieved from a second server.

19. The system of claim 18, wherein said second server comprises one of a network service provider server or an Internet Service Provider (ISP) server.

20. The system of claim 15, wherein said one or more processors are further configured to determine said stored data corresponding to said received second request is in said cache memory.

21. The system of claim 15, wherein said one or more processors are further configured to update said cache memory based on unavailability of said stored data in said cache memory.

22. A non-transitory computer readable medium having stored thereon, computer-executable instructions for causing a computer to execute operations, the operations comprising:
   in a first server:
      receiving a first request for lookup of an Internet Protocol (IP) address from a first computing device;
      instructing a cache memory in said first server to store data, that is associated with said received first request, based on said received first request for said lookup of said IP address;
      receiving a second request for said lookup of said IP address from said first computing device;
      retrieving said stored data from said cache memory based on said received second request;

retaining said stored data corresponding to said IP address within said cache memory based on a count of said IP address exceeding a first threshold, wherein said count corresponds to a number of at least one geographical IP lookup request; and
communicating via a communication network, said retrieved stored data to said first computing device.

* * * * *